May 27, 1969

J. H. FALGE 3,447,004

BREAKERLESS IGNITION CONTROL DISTRIBUTOR

Filed March 11, 1966

INVENTOR.
JOHN H. FALGE
BY C. R. Meland
HIS ATTORNEY

May 27, 1969  J. H. FALGE  3,447,004
BREAKERLESS IGNITION CONTROL DISTRIBUTOR
Filed March 11, 1966  Sheet 2 of 3
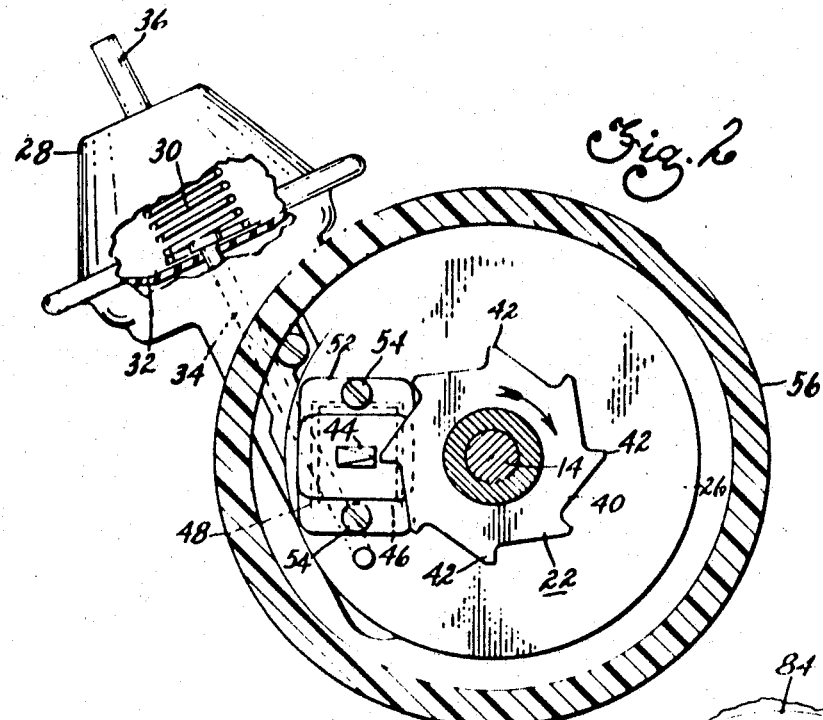
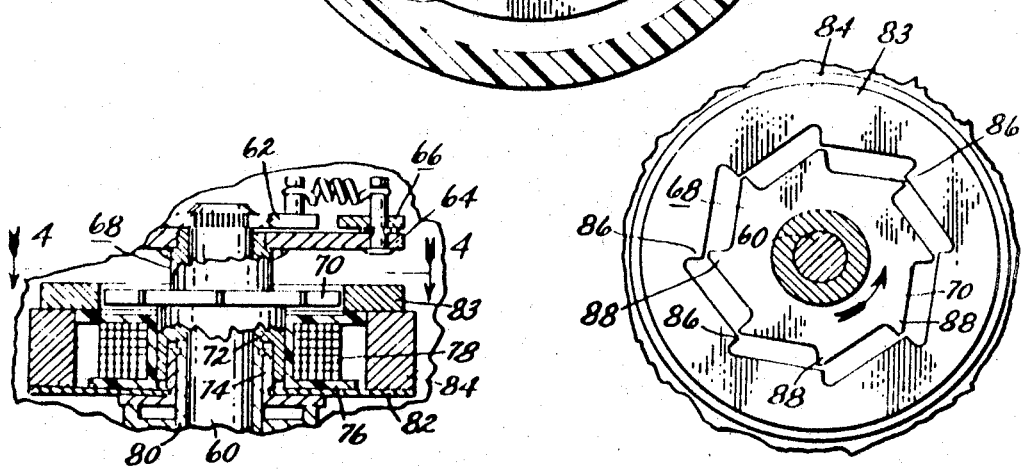
INVENTOR.
JOHN H. FALGE
BY C. R. Meland
HIS ATTORNEY INVENTOR.
JOHN H. FALGE
BY C. R. Meland
HIS ATTORNEY

United States Patent Office 3,447,004
Patented May 27, 1969

3,447,004
BREAKERLESS IGNITION CONTROL DISTRIBUTOR
John H. Falge, Anderson, Ind., assignor to General Motors Corporation, Detroit, Mich., a corporation of Delaware
Filed Mar. 11, 1966, Ser. No. 533,577
Int. Cl. H02k 11/00
U.S. Cl. 310—70       3 Claims

ABSTRACT OF THE DISCLOSURE

This invention relates to a voltage pulse generator for providing a timing voltage to control the operation of a semiconductor ignition system for an internal combustion engine. The voltage pulse generator includes a permanent magnet connected with a magnetic circuit that is coupled to an output coil. The timing voltage is induced in the output coil in synchronism with rotation of a rotor that is driven by an engine driven shaft. The rotor has a generally saw-tooth configuration providing a variable air-gap in the magnetic circuit which provides flux changes in the magnetic circuit that cause opposite polarity voltage pulses to be induced in the output coil of unequal amplitude.

---

This invention relates to a breakerless distributor of the pulse generator type which is capable of controlling the ignition system of an internal combustion engine.

The present invention is concerned with a pulse generator type of ignition control distributor that is useful in controlling a semiconductor ignition system for an internal combustion engine. The distributor of this invention is particularly suited for controlling a semiconductor ignition system of the type shown in the Short et al. patent, 3,087,001.

The Short et al. patent discloses a pulse generator type of control unit where the rotor has teeth of a symmetrical configuration which cooperate with a permanent magnet and an output coil to provide an output voltage that controls the semiconductor ignition system. Another type of distributor which has a symmetrical rotor is shown in United States patent application Ser. No. 237,628, filed on Nov. 14, 1962, which is now Patent 3,254,247 assigned to the assignee of this invention. Although the symmetrical type of voltage pulse generator shown in the Short et al. Patent 3,087,001, and in the above-mentioned patent application Ser. No. 237,628, now Patent 3,254,247, are satisfactory for controlling a semiconductor ignition system, it has been discovered that an improvement in control can be achieved by providing a voltage output from the output coil which has a reduced amplitude as compared to the conventional symmetrical rotor construction.

It accordingly is one of the objects of this invention to provide a pulse generator control for semiconductor ignition systems where the output voltage of the pulse generator has opposite polarity pulses and where one of the pulses is of a reduced magnitude as compared to symmetrical rotor pulse generators. It has been discovered that by providing a voltage output from the pulse generator of a type where one of the opposite polarity pulses is of a reduced magnitude, certain improvements in operation where the pulse generator is used to control a system of the type shown in the Short et al. patent is achieved. Thus, the likelihood of breaking down the transistor that is connected with the output coil of the pulse generator as shown in th Short et al. patent in a reverse direction is reduced. In addition, the amount of demagnetizing flux which would tend to demagnetize the permanent magnet used in the pulse generator is reduced.

Another object of this invention is to provide a pulse generator for controlling semiconductor ignition systems where the rotor of the pulse generator has an outer configuration that provides positive and negative output pulses of different magnitudes and shape when the rotor is rotated in a magnetic circuit.

Still another object of this invention is to provide a pulse generator control for ignition systems where the rotor of the pulse generator has a generally saw-tooth outer configuration. The saw-tooth configuration of the rotor provides a flux and voltage wave form which is not symmetrical and provides a wave form where pulses of one polarity are of a different magnitude than the pulses of an opposite polarity. With this arrangement, the point at which the voltage wave form reaches zero as compared to a symmetrical rotor is shifted and this has been found to improve the general operation of an ignition system when using the pulse generator of this invention.

A further object of this invention is to provide a voltage pulse generator for controlling an ignition system wherein both the rotor and a pole piece of the pulse generator have a generally saw-tooth configuration.

Further objects and advantage of the present invention will be apparent from the following description, reference being had to the accompanying drawings wherein preferred embodiments of the present invention are clearly shown.

In the drawings:

FIGURE 2 is a sectional view taken along line 2—2 of FIGURE 1.

FIGURE 3 is a sectional view of a modified pulse generator control unit made in accordance with this invention.

FIGURE 4 is a sectional view taken along line 4—4 of FIGURE 3.

Figure 1:
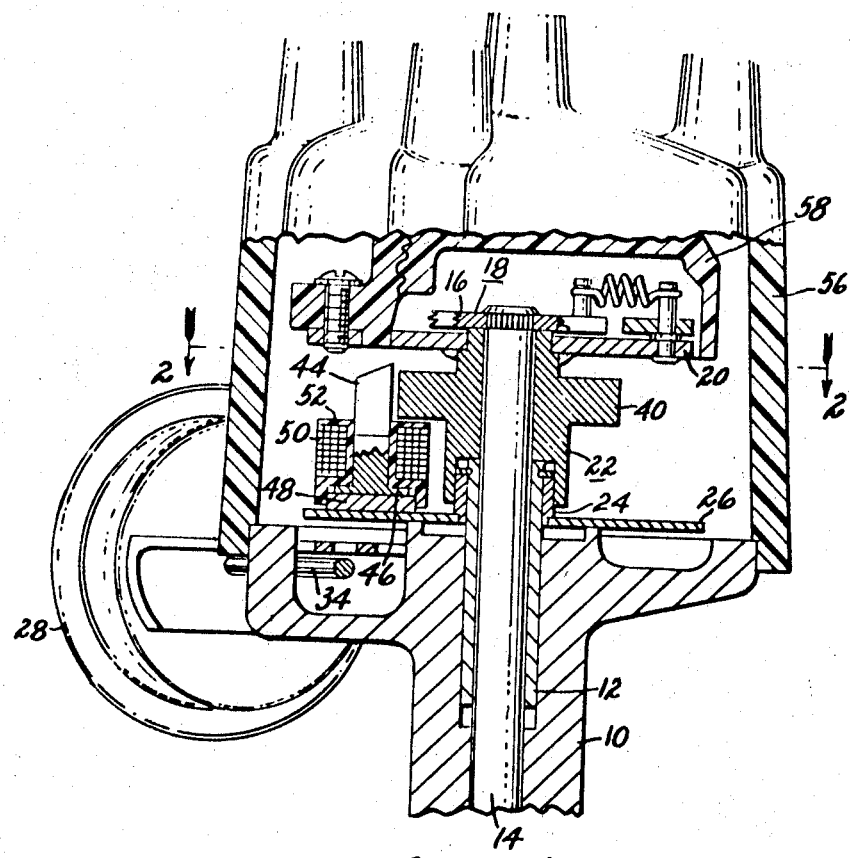
FIGURE 1 is a view partly in section of a pulse generator ignition distributor made in accordance with this invention.

Referring now to the drawings and more particularly to FIGURE 1, the reference numeral 10 designates the base of the pulse generator distributor of this invention. The base 10 has a central bore carrying a bearing 12 which supports a shaft 14. The shaft 14 is driven by the internal combustion engine and can be connected with the cam shaft of the engine in a manner well-known to those skilled in the art.

The shaft 14 is connected with a plate 16 which forms part of a centrifugal advance mechanism generally designated by reference numeral 18. The plate 16 drives the plate 20 through the flyweights of the centrifugal advance mechanism. This centrifugal advance mechanism can be of the type shown in patent application Ser. No. 237,628, filed on Nov. 14, 1962 and now Patent 3,254,247. The plate 20 is connected with a rotor 22 which is formed of magnetic material. The lower end of the rotor 22 fits over a bearing sleeve 24 which is connected with a timing plate 26. The timing plate is formed of magnetic material. The bearing sleeve 24 rotatably engages the upper end of the bearing 12, and the bearing sleeve 24 and the timing plate 26 can be adjusted relative to the base 10, the bearing 12 and shaft 14.

The device for adjusting the timing plate 26 is a conventional vacuum unit designated by reference numeral 28 and including a spring 30 and a diaphragm 32. The diaphragm 32 is connected with the timing plate 26 by a rod 34. The vacuum unit has a pipe 36 which is connected with the intake manifold of the internal combustion engine.

The rotor 22 has a section 40 which has an outer saw-tooth configuration forming circumferentially spaced teeth 42 as is best illustrated in FIGURE 2.

The toothed section 40 of the rotor 22 swings past a post or pole piece 44 which is formed or magnetic material. The lower end of the post 44 is secured to a plate 46 which engages the top end of a permanent magnet 48. The post 44 passes through a coil 50 which is wound on a coil form 52. The coil 50 forms the output coil for the pulse generator of this invention and it is seen that the coil, permanent magnet and post are fixed to the timing plate 26 by the screws 54. It will be appreciated from the foregoing that the output coil assembly including the post 44 and the output coil 50 will be adjusted relative to the saw-tooth rotor section 40 when the timing plate 26 is adjusted.

The pulse generator shown in FIGURE 1 includes a distributor cap 56 of conventional construction which is secured to the base 10. This distributor cap has the usual outer circumferentially spaced electrodes and a center electrode which are periodically connected by a contact carried by the distributor rotor 58. The distributor rotor 58 is driven by the plate 20 of the centrifugal advance mechanism 18 in a conventional manner.

Figure 6:
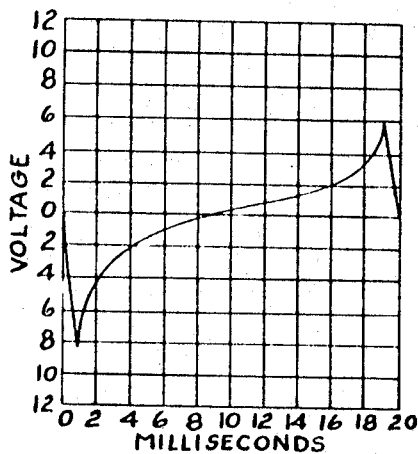
FIGURE 6 is a graphic representation of the output voltage wave form of the pulse generator shown in FIGURES 1 and 2.

When the shaft 14 of the distributor pulse generator shown in FIGURES 1 and 2 is driven by an engine, pulses of voltage are induced in the coil winding 50 and the open circuit output voltage wave form of this coil winding will be like that shown in FIGURE 6. The flux path is from the permanent magnet 48, through the plate 46, through the post 44, through the rotor 22, and then back to an opposite side of the permanent magnet 48 through the timing plate 26. As the rotor rotates, the reluctance of this flux path is varied and a voltage is generated in the pick-up coil 50 which has a wave form of the type shown in FIGURE 6.

Figure 5:
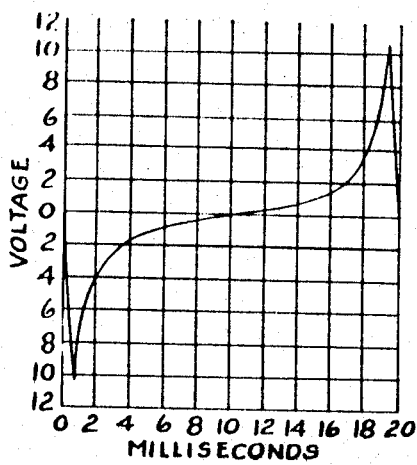
FIGURE 5 is a graphic representation of the open circuit output voltage wave form of a conventional pulse generator of the type shown in above-mentioned patent application Ser. No. 237,628, which is now Patent 33,254,247.

FIGURE 5 illustrates the open circuit output voltage wave form of a pulse generator distributor of a type having a symmetrical rotor which is shown in the patent to Short, 3,087,001, and in the above-mentioned patent application Ser. No. 237,628 now Patent 3,254,247. It will be observed from an inspection of FIGURE 5 that the positive and negative pulses have approximately the same amplitude. When a pulse generator having the output wave form shown in FIGURE 5 is connected with an ignition system of the type shown in Patent 3,087,001, the pulse to the left of the 10 millisecond line is used to turn on a control transistor while the pulse to the right of the 10 millisecond line is used to turn off the transistor.

By comparing the voltage wave forms in FIGURES 5 and 6, it can be seen that the amplitude of the voltage pulse which is used to turn off the control transistor has a reduced amplitude in FIGURE 6.

Thus, in FIGURE 6, the part of the voltage wave form to the right of the 10 millisecond line has been reduced to a value of six as compared to a value of slightly over ten in FIGURE 5. The pulse of voltage to the left of the 10 millisecond line has substantially the same amplitude in FIGURE 6 as it had in FIGURE 5.

The advantage of the output voltage wave form developed by the pulse generator of this invention which is illustrated in FIGURE 6 is that by reducing the amplitude of the pulse to the right of the 10 millisecond line, there is less chance of causing a high voltage breakdown of the transistor that is connected with the output coil when the transistor is reverse biased by this part of the output voltage wave form. In addition, the demagnetizing flux which would tend to demagnetize the magnet is reduced and less timing error is obtained at higher engine speeds.

The output voltage wave form of a pulse generator distributor can be further improved by providing an arrangement wherein the pole piece is saw-tooth shaped as well as the rotor. This arrangement is depicted in FIGURES 3 and 4 of the drawings. In this arrangement, a shaft 60 drives a plate 62 which in turn drives the plate 64 through suitable flyweights that form the centrifugal advance mechanism for the distributor generally designated by reference numeral 66. The plate 64 is connected with a rotor 68 that is formed of magnetic material and this rotor has a saw-tooth section 70. The rotor 68 has a section 72 positioned between bearing 74 and a coil form 76 which carries the output coil 78. The bearing 74 is journalled for rotation on the shaft bearing 80 and is connected with the timing plate 82 which can be shifted by a vacuum control unit that is not illustrated.

An annular permanent magnet 84 is provided which is located between the timing plate 82 and a pole piece 83. The pole piece 83 and the timing plate 82 are formed of magnetic material as is the rotor 68. The permanent magnet 84, coil winding 78 and pole piece 83 are all secured to the timing plate 82 by suitable fasteners which are not illustrated.

It is seen from FIGURE 4 that the pole piece 83 has an internal saw-tooth configuration forming the teeth 86 which cooperate with the saw-tooth teeth 88 of the saw-tooth section 70 of rotor 68.

In FIGURES 3 and 4, the plate 64 drives a rotor like the rotor 58 shown in FIGURE 1 and the pulse generator will have a distributor cap of the same type shown in FIGURE 1.

Figure 7:
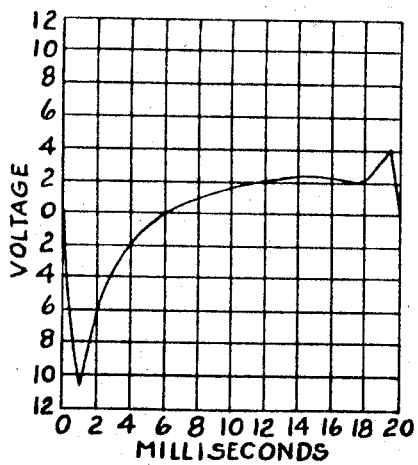
FIGURE 7 is a graphic representation of the ouput voltage wave form of the modified pulse generator shown in FIGURES 3 and 4.

The flux path in FIGURE 3 is from one end of the permanent magnet 84, through the pole piece 83, through saw-tooth rotor section 70, through section 72 of the rotor 68 and then back to the opposite side of the permanent magnet 84 through timing plate 82. The open circuit output voltage wave form of the pulse generator shown in FIGURES 3 and 4 is depicted in FIGURE 7. It is seen that the cross-over point where the voltage goes to zero has been shifted from the 10 millisecond line to approximately the six millisecond line as compared to the symmetrical rotor of FIGURE 5 and also as compared to the pulse generator of FIGURES 1 and 2, the output voltage wave form of which is illustrated in FIGURE 6. In addition, it is seen that the output voltage developed above the zero voltage line and to the right of the cross-over point has been greatly reduced as compared to the voltage output depicted in FIGURES 5 and 6.

It has been found that the change in the cross over point is beneficial where the pulse generator controls an ignition system of the type shown in the Short Patent 3,087,001. In addition, the reduced voltage which is generated in the output coil which is above the zero voltage line and to the right of the six millisecond line in FIGURE 7 reduces the likelihood of damaging the transistor during the time that the transistor is to be turned off by this part of the voltage wave form. The pulse generator of FIGURES 3 and 4 also has the advantage of reducing the demagnetizing effect on the permanent magnet 84 and in general provides better performance at lower engine speeds and less timing error at higher engine speeds.

While the embodiments of the present invention as herein disclosed constitute a preefrred form, it is to be understood that other forms might be adopted.

What is claimed is as follows:

1. A voltage pulse generator for controlling a semiconductor ignition system for an internal combustion engine comprising, a shaft adapted to be driven by an engine, an output coil adapted to be coupled to a semiconductor ignition system to control said ignition system, a source of magnetic flux, a magnetic circuit magnetically coupled to said source of magnetic flux and linkage said output coil whereby a voltage is induced in said output coil when changes in magnetic flux occur in said magnetic circuit, said magnetic circuit including a pole piece formed of magnetic material and a rotor formed of magnetic material driven by said shaft, said pole piece and rotor having opposed edges defining a series air-gap in said magnetic circuit, the edge of said rotor having a generally saw-tooth configuration whereby the air-gap between said edges of said rotor and pole pieces varies as a function of said saw-tooth configuration and provides flux changes in said magnetic circuit which are operative to induce opposite polarity voltage pulses in said output coil of unequal amplitude, said series air-gap in said magnetic circuit directly controlling the rate of change of flux linking said output coil.

2. A voltage pulse generator for controlling a semiconductor ignition system for an internal combustion engine comprising, a base member, a shaft rotatable with respect to said base member, a plate member formed of magnetic material, a permanent magnet, a pole piece formed of magnetic material, an output coil, one end of said permanent magnet magnetically coupled to said plate member, the opposite end of said permanent magnet magnetically coupled to said pole piece, said pole piece and output coil positioned so as to be magnetically coupled whereby changes in magnetic flux in said pole piece result in voltages being induced in said output coil, a rotor formed of magnetic material driven by said shaft having a substantially constant air-gap with said plate member and having an annular section formed with a generally saw-tooth configuration to provide a saw-tooth edge, said saw-tooth edge of said rotor being spaced from an edge of said pole piece whereby a variable air-gap is provided between said pole piece and saw-tooth edge of said rotor when said rotor is rotated relative to said pole piece, said saw-tooth edge providing flux changes in said pole piece which are operative to induce opposite polarity voltage pulses in said output coil of unequal amplitude, said constant and variable air-gaps located in a series magnetic circuit with said pole piece whereby the flux linking said output coil is controlled by said variable air-gap.

3. A voltage pulse generator for controlling a semiconductor ignition system for an internal combustion engine comprising, a base member, a shaft rotatably supported by said base member and adapted to be driven by an engine, a plate member formed of magnetic material, an annular permanent magnet supported by said plate member, one end of said permanent magnet located in a magnetic circuit with said plate member, a coil winding supported by said plate member, a pole piece supported by said plate member located in a magnetic circuit with an opposite end of said permanent magnet, a rotor formed of magnetic material having a part disposed within said coil winding and a part spaced from said pole piece, said part spaced from said pole piece having a generally saw-toothed configuration providing a saw-tooth edge facing said pole piece, the inner wall of said pole piece having a generally complementary saw-tooth configuration providing a saw-tooth edge facing the saw-tooth edge of said rotor, said part of said rotor disposed within said output coil spaced from said plate member to provide a constant air-gap with said plate member, said saw-tooth edges of said rotor and pole piece providing flux changes for flux linking said output coil whereby opposite polarity voltage pulses are induced in said output coil of unequal amplitude when said rotor is rotated relative to said pole piece.

References Cited

UNITED STATES PATENTS

| | | | |
|---|---|---|---|
| 3,299,875 | 1/1967 | Skay | 310—70 |
| 3,254,247 | 5/1966 | Falge | 310—70 |
| 3,198,973 | 8/1965 | Short | 310—70 |
| 1,944,590 | 1/1934 | Beeh | 310—70 |
| 3,022,389 | 2/1962 | Wolrab | 310—70 |
| 3,145,324 | 8/1964 | Race | 310—70 |
| 3,253,168 | 5/1966 | Robbins | 310—70 |

J. D. MILLER, *Primary Examiner.*

U.S. Cl. X.R.

123—148; 200—19; 310—154, 193